(12) United States Patent
Kang et al.

(10) Patent No.: US 8,587,937 B2
(45) Date of Patent: Nov. 19, 2013

(54) DISPLAY DEVICE AND MANUFACTURING MOLD SET OF FRONT COVER THEREOF

(75) Inventors: Han Moog Kang, Seoul (KR); Byoung Rak Lee, Suwon-si (KR)

(73) Assignee: Samsung Electronics Co, Ltd., Suwon-si (KR)

(*) Notice: Subject to any disclaimer, the term of this patent is extended or adjusted under 35 U.S.C. 154(b) by 135 days.

(21) Appl. No.: 13/009,254

(22) Filed: Jan. 19, 2011

(65) Prior Publication Data

US 2011/0182017 A1 Jul. 28, 2011

(30) Foreign Application Priority Data

Jan. 26, 2010 (KR) .................. 10-2010-0006804

(51) Int. Cl.
*G06F 1/16* (2006.01)
*B29C 45/26* (2006.01)

(52) U.S. Cl.
USPC ............ 361/679.21; 361/679.22; 361/679.24; 361/679.26; 361/679.55; 361/679.56; 348/376; 348/794; 348/836; 349/58; 349/59

(58) Field of Classification Search
USPC ............................ 361/679.21, 679.55, 679.01
See application file for complete search history.

(56) References Cited

U.S. PATENT DOCUMENTS

2009/0168319 A1* 7/2009 Jeon et al. ................ 361/679.22
2011/0023344 A1* 2/2011 Penisson ........................ 40/711

FOREIGN PATENT DOCUMENTS

| KR | 10-2008-0106605 | 12/2008 |
| KR | 10-2009-0081816 | 7/2009 |
| KR | 10-2010-0008018 | 1/2010 |

OTHER PUBLICATIONS

International Search Report issued Sep. 27, 2011 in International Application No. PCT/KR2011/000358.

* cited by examiner

*Primary Examiner* — Tuan T Dinh
*Assistant Examiner* — Mukund G Patel
(74) *Attorney, Agent, or Firm* — Stanzione & Kim, LLP

(57) ABSTRACT

A front cover of a display device, which includes a first front cover unit and a second front cover unit disposed in a rear of the first front cover, and a manufacturing mold set of the front cover. The front cover minimizes and/or prevents air introduction through gaps between the first front cover unit and the second front cover unit and deterioration of the quality of the external appearance of the front cover thereby.

16 Claims, 7 Drawing Sheets

DISPLAY DEVICE AND MANUFACTURING MOLD SET OF FRONT COVER THEREOF

CROSS-REFERENCE TO RELATED APPLICATIONS

This application claims priority under 35 U.S.C. §119(a) from Korean Patent Application No. 2010-0006804, filed on Jan. 26, 2010 in the Korean Intellectual Property Office, the disclosure of which is incorporated herein in its entirety by reference.

BACKGROUND

1. Field of the Invention

Exemplary embodiments of the present general inventive concept relate to a front cover forming the front surface of a display device and a manufacturing method thereof.

2. Description of the Related Art

In general, display devices, each of which is provided with a display panel to display an image, include display panels, PDPs (i.e., Plasma Display Panels), etc.

A display device includes a display module on which an image is displayed, a front cover to cover the edge of the front surface of the display module, and a rear cover to cover the rear surface of the display module.

With increasing demand for high-level display devices, design of display devices is now a focus of attention. Particularly, a front cover of a display device is attracted by user's eye, and thus an image of a product is greatly variable according to design of the front cover.

SUMMARY

Therefore, a display device in which a front cover includes a first front cover unit being transparent and a second front cover unit being opaque and arranged in the rear of the first front cover unit, such that a color of the front cover is naturally changed has been proposed.

Exemplary embodiments of the present general inventive concept provide a display device which improves an aesthetically pleasing external appearance of a front cover including a first front cover unit and a second front cover unit, and a front cover manufacturing mold set applied to the display device.

Additional features and utilities of the present general inventive concept will be set forth in part in the description which follows and, in part, will be obvious from the description, or may be learned by practice of the present general inventive concept.

Exemplary embodiments of the present general inventive concept provide a display device that includes a display module to display an image, and a front cover to cover an edge of a front surface of the display module, and including a first front cover unit and a second front cover unit formed in the rear of the first front cover unit, where the first front cover unit includes a first front part having an approximately rectangular ring shape, and first side parts extended backwardly from at least one of an inner end and an outer end of the first front part, and the second front cover unit includes overlap parts extended to cover portions of rear surfaces of the first side parts.

The first side parts may include a first outer side part extended backwardly from the outer end of the first front part, and the overlap parts of the second front cover unit may include a first overlap part extended outwardly to cover a portion of a rear surface of the first outer side part.

The second front cover unit may further include a second front part disposed in a rear of the first front part and a second outer side part extended backwardly from an outer end of the second front part and disposed within the first outer side part, and the first overlap part may be extended outwardly from the second outer side part.

The first side parts may include a first inner side part extended backwardly from an inner end of the first front part, and the overlap parts of the second front cover unit may include a second overlap part extended inwardly to cover a portion of a rear surface of the first inner side part.

The second front cover unit may further include a second front part disposed in a rear of the first front part and a second inner side part extended backwardly from an inner end of the second front part and disposed within the first inner side part, and the second overlap part may be extended inwardly from the second inner side part.

Any one of the first front cover unit and the second front cover unit may be made of a transparent material, and the other one of the first front cover unit and the second front cover unit may be made of an opaque material.

Exemplary embodiments of the present general inventive concept may also provide a manufacturing mold set of a front cover of a display device to manufacture a first front cover unit with a first front part and first side parts extended from ends of the first front part, and a second front cover unit disposed in a rear of the first front cover unit by double injection molding, includes a first mold provided with first molding planes having a shape corresponding to a front surface of the first front cover unit, a second mold provided with second molding planes having a shape corresponding to a rear surface of the first front cover unit to form a first cavity having a shape corresponding to the first front cover unit together with the first molding planes, and a third mold provided with third molding planes having a shape corresponding to a rear surface of the second front cover unit to form a second cavity having a shape corresponding to the second front cover unit together with the rear surface of the first front cover unit, wherein the third molding planes include overlap part molding planes opposite to portions of the rear surfaces of the first side parts.

The third molding planes may include a first overlap part molding plane separated from a rear surface of a first outer side part extended backwardly from an outer end of the first front part.

The third molding planes may include a second overlap part molding plane separated from a rear surface of a first inner side part extended backwardly from an inner end of the first front part.

Exemplary embodiments of the present general inventive concept also provide a display device including a display module to display an image, a front cover to cover an edge of a front surface of the display module, the front cover including first side parts extended toward the display module from at least one of a first end and a second end of the front cover, and reflection members disposed adjacent to the display module and the front cover to reflect light that is transmitted through the front cover so as to change a color of a front surface of the display device.

The front cover of the display device can include a first front cover unit is made of a first material, and a second front cover unit is made of a second material that is disposed on a first surface of the first front cover unit so as to be adjacent to the display module.

The display device can include where the first material is a transparent material, and the second material is an opaque material.

The display device can include where the second front cover includes overlap parts disposed at opposite ends of the second front cover to cover at least portions of the first side parts of the front cover.

The display device can include where the overlap parts of the second front cover are disposed so as to cover corresponding first and second ends of the first front cover.

The display device can include where the first front cover unit and the second front cover unit are integrally formed.

The display device can include where the first front cover unit and the second front cover unit are affixed to one another.

The display device can include where the first front cover unit and the second front cover unit each have a rectangular ring shape.

The display device can include where the first front cover unit and the second front cover unit are disposed so as to minimize airflow between the first front cover unit and the second front cover unit.

Exemplary embodiments of the present general inventive concept may also provide a cover to cover a display module of a display device, the cover including a first front cover unit having first outer side parts extended at angles from each end of the first front cover unit, the first front cover unit having a first surface and a second surface, and a second front cover unit having second outer side parts ended at angles from each end of the second front cover unit that is disposed on the second surface of the first front cover unit, where the second outer side parts of the second front cover unit overlap at least portions of the first outer side parts of the front cover, and at least one the second outer side parts is disposed adjacent to the display module of the display device.

The first front cover unit can be made of a transparent material, and the second front cover unit can made of an opaque material.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
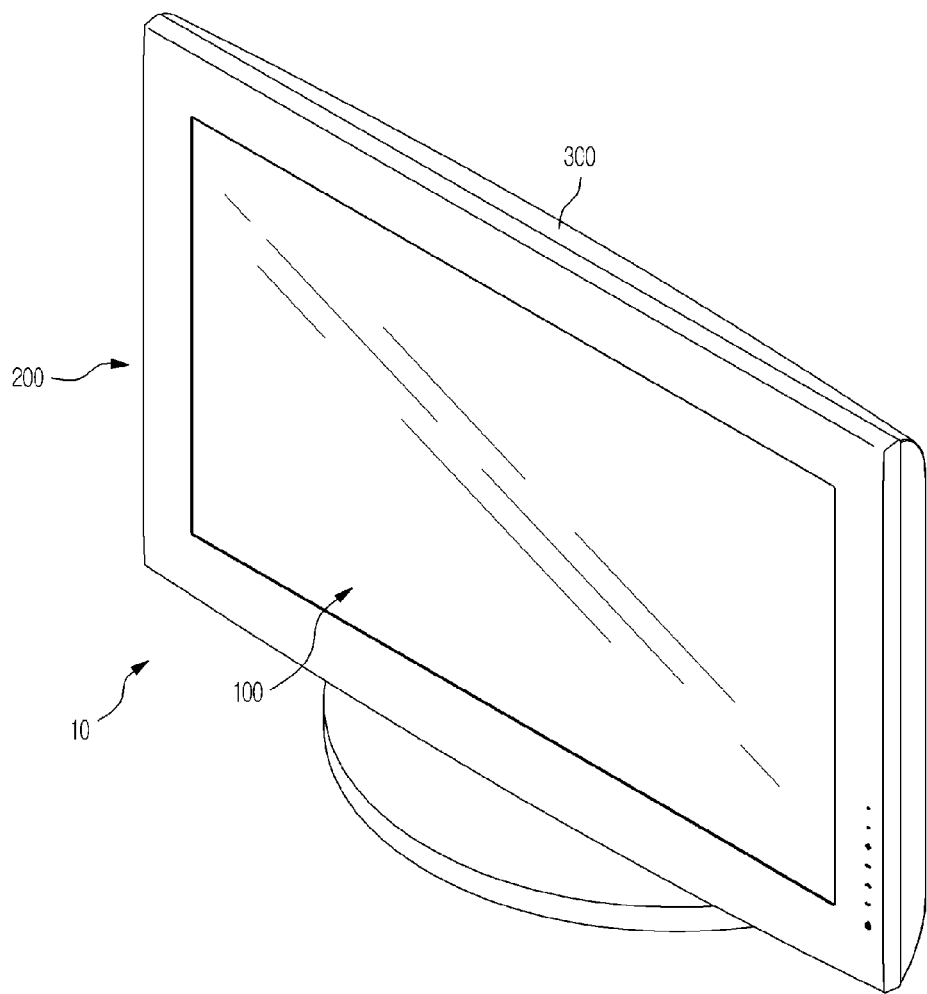
FIG. 1 illustrates a perspective view of a display device in accordance with exemplary embodiments of the present general inventive concept.

Reference will now be made in detail to the embodiments of the present invention, examples of which are illustrated in the accompanying drawings, wherein like reference numerals refer to like elements throughout. The embodiments are described below in order to explain the present general inventive concept by referring to the figures.

Hereinafter, a display device in accordance with exemplary embodiments of the present general inventive concept will be described with reference to the accompanying drawings.

Figure 2:
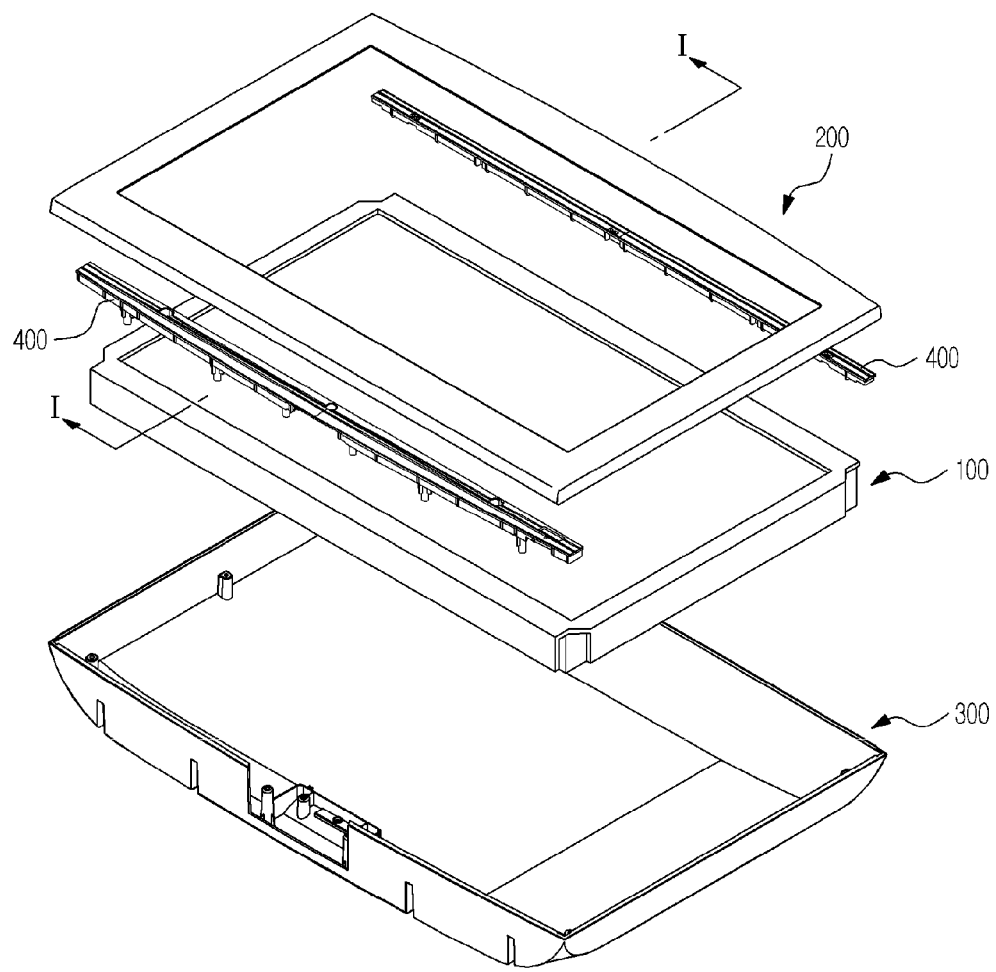
FIG. 2 illustrates an exploded perspective view of the display device in accordance with exemplary embodiments of the present general inventive concept.

As illustrated in FIGS. 1 and 2, a display device 10 in accordance with exemplary embodiments of the present general inventive concept can include a display module 100 to display an image, a front cover 200 to cover an edge of a front surface of the display module 100, and a rear cover 300 connected with the front cover 200 in a forward and backward direction to cover a rear surface of the display module 100.

Figure 3:
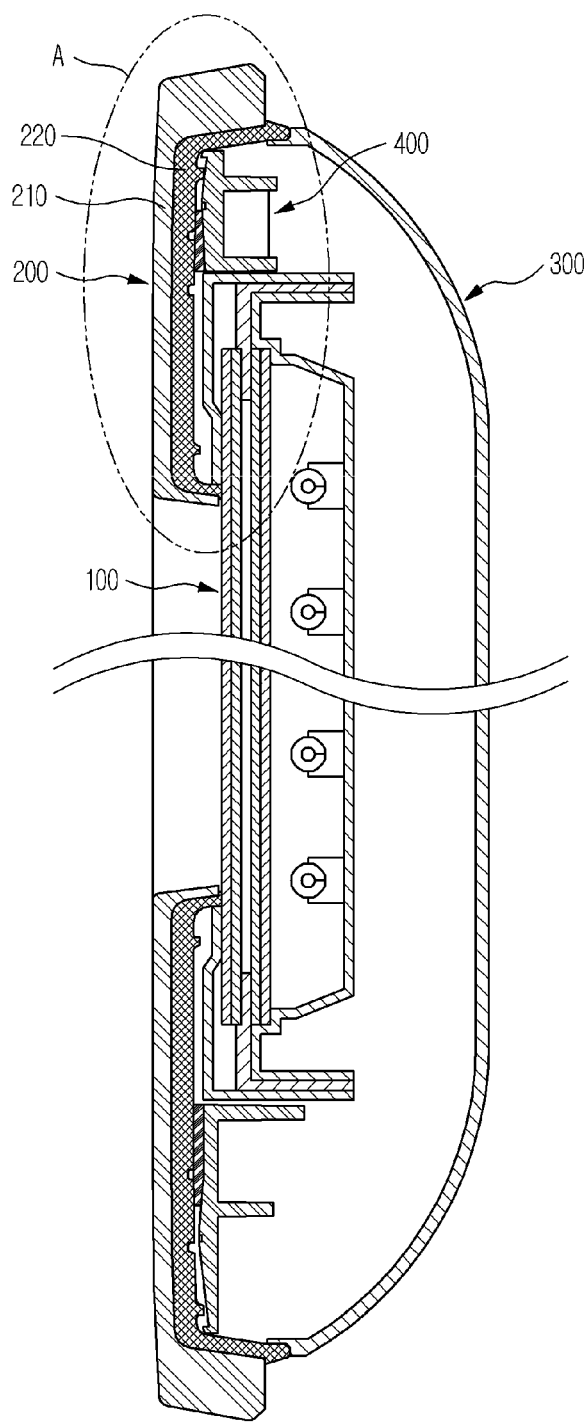
FIG. 3 illustrate a sectional view taken along the line I-I of FIG. 2.

The front cover 200, as illustrated in FIG. 3, can include a first front cover unit 210 made of a transparent material and a second front cover unit 220 made of an opaque material such that a color of the front surface of the display device 10 can be changed. The first front cover unit 210 and the second front cover unit 220 can be integrally formed by double injection molding and/or any suitable method to integrally form the cover units 210 and 220 to carry out the exemplary embodiments of the present general inventive concept. Alternatively, the first front cover unit 210 and the second front cover unit 220 can be affixed and/or coupled to one another by fasteners.

Reflection members 400 can be arranged at upper and lower ends of the rear surface of the front cover 200. Reflection members 400 can reflect light (e.g., reflect light introduced into the front cover 200) forwardly so as to change a color tone of the front cover 200. That is, light that may be incident to and/or transmitted through the front cover 200 may be reflected by reflection members 400 back towards the front cover 200 so as to change a color tone of the front cover 200.

Figure 4:
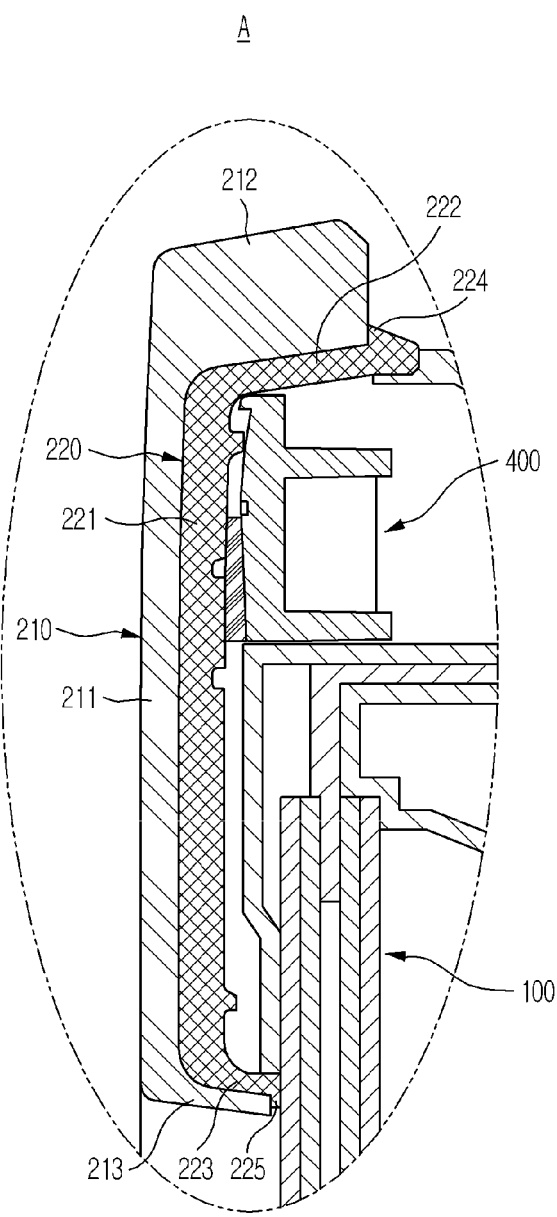
FIG. 4 illustrates an enlarged view of the portion A of FIG. 3.

The front cover unit 210, as illustrated in FIG. 4, can include a first front part 211 having an approximately rectangular ring shape to form the front surface of the front cover 200, and first side parts 212 and 213 extended backwardly from the first front part 211. Here, the first side parts 212 and 213 can include a first outer side part 212 extended backwardly from an outer end of the first front part 211 and a first inner side part 213 extended backwardly from an inner end of the first front part 211.

In the same manner as the first front cover unit 210, the second front cover unit 220 can have an approximately rectangular ring shape which can be installed in a rear of the first front cover unit 210, and can include a second front part 221 arranged in the rear of the first front part 211, and second side parts 222 and 223 extended backwardly from the second front part 221. The second side parts 222 and 223 can include a second outer side part 222 extended backwardly from the outer end of the second front part 221 and disposed within the first outer side part 212, and a second inner side part 223 extended backwardly from the inner end of the second front part 221 and disposed within the first inner side part 213.

Here, since the first front cover unit 210 and the second front cover unit 220 can be made of different materials, when external impact having a force that is greater than a predetermined amount is applied to the front cover 200, gaps may be formed between the first front cover unit 210 and the second front cover unit 220. Particularly, a gap between the first outer side part 212 and the second outer side part 222, the rear ends of which are exposed to the outside. A gap may be formed between the first inner side part 213 and the second inner side part 223, the rear ends of which are exposed to the outside. Air may be introduced and/or received through one or more of the gaps. If air is introduced and/or received through the gap between the rear ends of the first outer side part 212 and the second outer side part 222 and the gap between the rear ends of the first inner side part 213 and the second inner side part 223, a refractive index of light passing through the gaps can be partially changed by air, thereby changing the external appearance of the front cover 200 (e.g., deteriorating and/or changing the external appearance of the front cover 200).

To minimize and/or prevent such deterioration and/or change in the external appearance of the front cover, the second front cover unit 220 can include overlap parts 224 and 225 to cover at least portions of the rear surfaces of the first side parts 212 and 213.

The overlap parts 224 and 225 can include a first overlap part 224 extended outwardly from the rear end of the second outer side part 222 to cover a portion of the rear surface of the first outer side part 212, and a second overlap part 225 extended inwardly from the rear end of the second inner side part 223 to cover at least a portion of the rear surface of the first inner side part 213.

If the portion of the rear surface of the first outer side part 212 and the portion of the rear surface of the first inner side part 213 are covered with the first overlap part 224 and the second overlap part 225, air that is introduced and/or received through the gap between the first outer side part 212 and the second outer side part 222 can be suppressed by the first overlap part 224, and air introduce and/or received through the gap between the first inner side part 213 and the second inner side part 223 can be suppressed by the second overlap part 225.

Although air can be introduced and/or received through the gap between the first outer side part 212 and the second outer side part 222 and the gap between the first inner side part 213 and the second inner side part 223, an amount of light passing through the gap between the first outer side part 212 and the second outer side part 222 and the gap between the first inner side part 213 and the second inner side part 223 can be reduced by the first overlap part 224 and the second overlap part 225. Thus, the introduction and/or reception of air through the gap between the first outer side part 212 and the second outer side part 222 and the gap between the first inner side part 213 and the second inner side part 223 can be reduced, and deterioration of the quality of the external appearance of the front cover 200 thereby can be minimized.

A manufacturing mold set of the front cover of the above display device will be described in detail with reference to the accompanying drawings.

Figure 5:
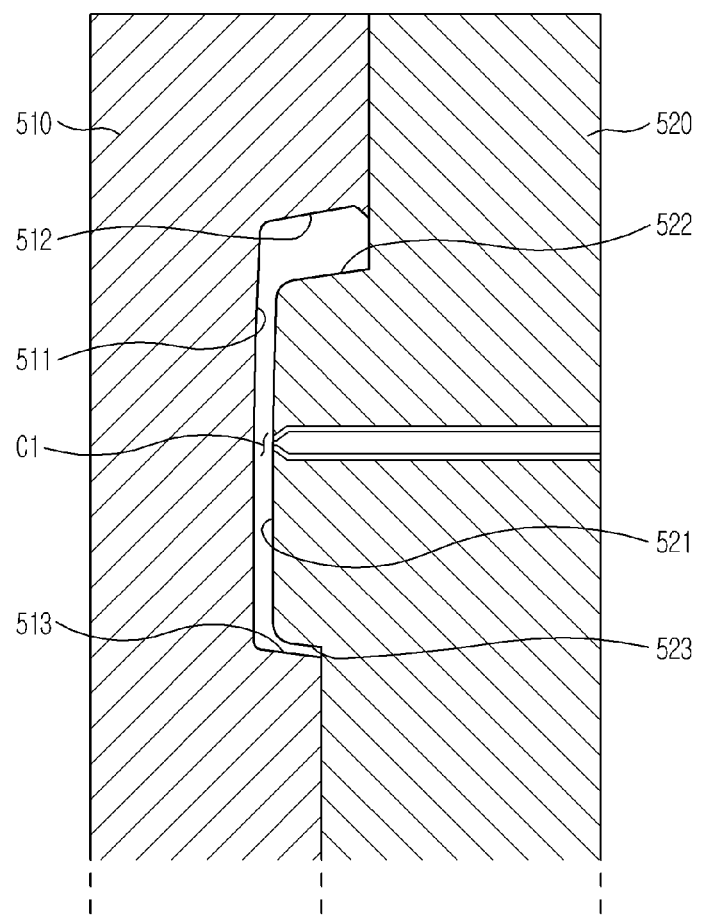
FIGS. 5 to 7 are sectional views illustrating operation of a manufacturing mold set of a front cover of a display device in accordance with exemplary embodiments of the present general inventive concept.
Figure 6:
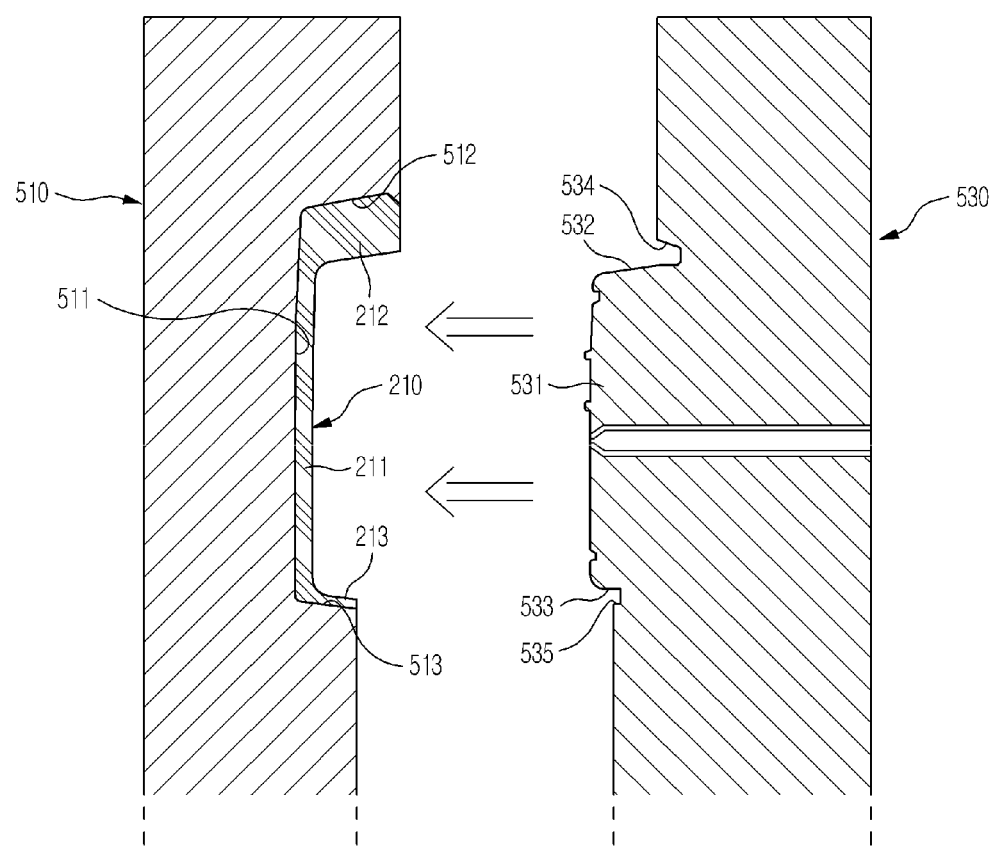
Figure 7:
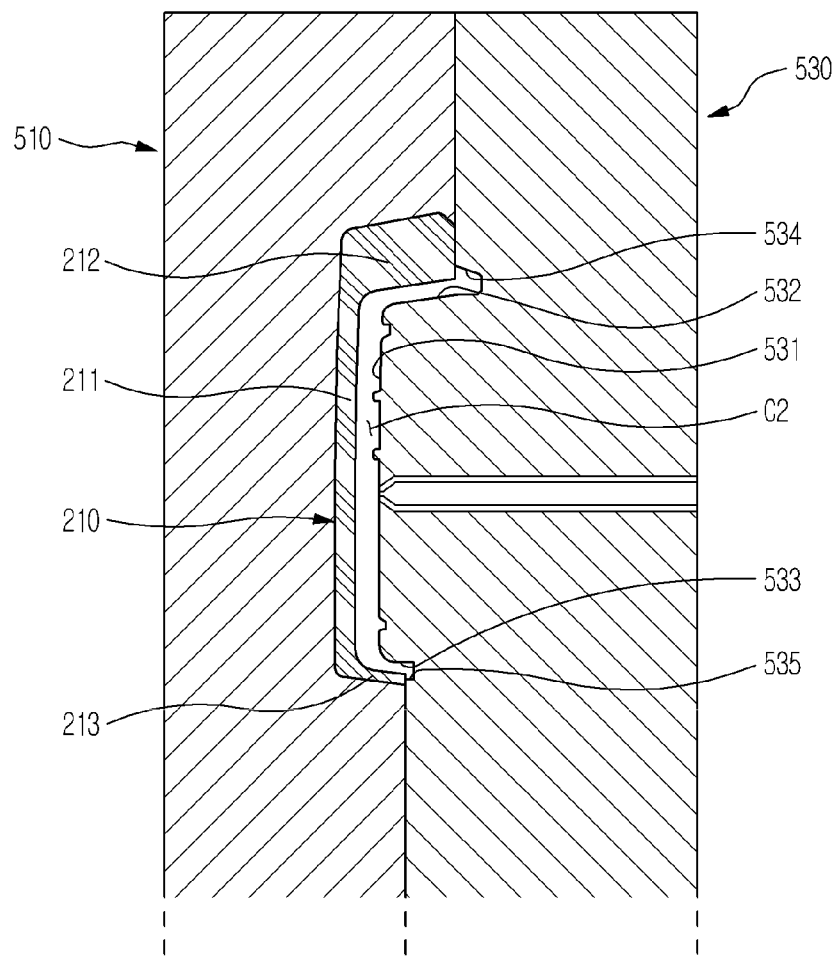

As illustrated in FIGS. 5 to 7, a manufacturing mold set 500 of the front cover of the display device can include a first mold 510 provided with first molding planes 511, 512 and 513 having a shape corresponding to the front surface of the first front cover unit 210. The manufacturing mold set 500 can include a second mold 520 provided with second molding planes 521, 522 and 523 having a shape corresponding to the rear surface of the first front cover unit 210 to form a first cavity C1 having a shape corresponding to the first front cover unit 210 together with the first molding planes 511, 512 and 513. The manufacturing mold set 500 can include a third mold 530 provided with third molding planes 531, 532, 533, 534 and 535 having a shape corresponding to the rear surface of the second front cover unit 220 to form a second cavity C2 having a shape corresponding to the second front cover unit 220 together with the rear surface of the first front cover unit 210.

The first molding planes 511, 512 and 513 can include a first front part molding plane 511 having a shape corresponding to the front surface of the first front part 211, a first outer side part molding plane 512 having a shape corresponding to the external surface of the first outer side part 212, and a first inner side part molding plane 513 having a shape corresponding to the external surface of the first inner side part 213.

The second molding planes 521, 522, and 523 can include a second front part molding plane 521 having a shape corresponding to the rear surface of the first front part 211 and disposed so as to be separated from the first front part molding plane 511 opposite to the first front part molding plane 511. A second outer side part molding plane 522 can have a shape corresponding to an internal surface of the first outer side part 212 and disposed so as to be separated from the first outer side part molding plane 512 opposite to the first outer side part molding plane 512. A second inner side part molding plane 523 can have a shape corresponding to an internal surface of the first inner side part 213 and disposed so as to be separated from the first inner side part molding plane 513 opposite to the first inner side part molding plane 513.

The third molding planes 531, 532, 533, 534 and 535 can include a third front part molding plane 531 disposed so as to be separated from a rear surface of the first front cover unit 210 formed on the first mold 510 opposite to the rear surface of the first front cover unit 210. A third outer side part molding plane 532 can be disposed so as to be separated from the internal surface of the first outer side part 212 of the first front cover unit 210 opposite to the internal surface of the first outer side part 212. A third inner side part molding plane 533 can be disposed so as to be separated from the internal surface of the first inner side part 213 of the first front cover 210 opposite to the internal surface of the first inner side part 213.

To form the above-described first overlap part 224, the third molding planes 531, 532, 533, 534, and 535 can include a first overlap part molding plane 534 disposed so as to be separated from a portion of the rear surface of the first outer side part 212 of the first front cover 210 opposite to the portion of the rear surface of the first outer side part 212. To form the above-described second overlap part 225, the third molding planes 531, 532, 533, 534 and 535 can include a second overlap part molding plane 535 disposed so as to be separated from a portion of the rear surface of the first inner side part 213 of the first front cover 210 opposite to the portion of the rear surface of the first inner side part 213.

illustrated in FIG. 5, a molten resin can be inserted into the first cavity C1, formed between the first molding planes 511, 512 and 513 and the second molding planes 521, 522, and 523 by connecting the first mold 510 and the second mold 520, to form the first front cover unit 210. The second mold 520 can be separated from the first mold 510 when the first front cover unit 210 is mounted on the first mold 510. As illustrated in FIG. 6, the third mold 530 can be connected to the first mold 510. As illustrated in FIG. 7, a molten resin can be injected into the second cavity C2, formed between the rear surface of the first front cover unit 210 and the third molding planes 531, 532, 533, 534 and 535, to form the second front cover unit 220.

During the formation of the second front cover unit 220 through the first mold 510 and the third mold 530, the molten resin can be introduced into a gap between a portion of the rear surface of the first outer side part 212 and the first overlap part molding plane 534 to from the first overlap part 224 covering the portion of the rear surface of the first outer side part 212 integrally with the second front cover unit 220. The molten resin can be introduced into a gap between a portion of the rear surface of the first inner side part 213 and the second overlap part molding plane 535 to form the second overlap part 225 covering the portion of the rear surface of the first inner side part 213 integrally with the second front cover unit 220.

As is apparent from the above description, in a display device and a front cover manufacturing mold set applied to the display device in accordance with exemplary embodiments of the present general inventive concept, overlap parts of a second front cover unit cover portions of the rear surfaces of side parts of a first front cover unit to minimize and/or prevent deterioration of the quality of the external appearance of a front cover generated if air is received and/or introduced through a gap between a first outer side part of the first front cover unit and a second outer side part of the second front cover unit and a gap between a first inner side part of the first front cover unit and a second inner side part of the second front cover unit.

Although several few embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A display device comprising:
   a display module to display an image;
   a front cover to cover an edge of a front surface of the display module, the front cover including:
      a first front cover unit having a front and a rear; and
      a second front cover unit formed in the rear of the first front cover unit,
   wherein:
      the first front cover unit includes a first front part having a rectangular ring shape, and first side parts extended backwardly from at least one of an inner end and an outer end of the first front part; and
      the second front cover unit includes overlap parts extended to cover portions of rear surfaces of the first side parts, where the uncovered portions of the first side parts do not extend beyond the overlap parts of the second front cover unit; and
   reflection members disposed adjacent to the display module and the front cover to reflect light that is transmitted through the front cover so as to change a color of a front surface of the display device.

2. The display device according to claim 1, wherein the first side parts include a first outer side part extended backwardly from the outer end of the first front part, and the overlap parts of the second front cover unit include a first overlap part extended outwardly to cover a portion of a rear surface of the first outer side part.

3. The display device according to claim 2, wherein the second front cover unit further includes a second front part disposed in a rear of the first front part and a second outer side part extended backwardly from an outer end of the second front part and disposed within the first outer side part, and the first overlap part is extended outwardly from the second outer side part.

4. The display device according to claim 1, wherein the first side parts include a first inner side part extended backwardly from an inner end of the first front part, and the overlap parts of the second front cover unit includes a second overlap part extended inwardly to cover a portion of a rear surface of the first inner side part.

5. The display device according to claim 4, wherein the second front cover unit further includes a second front part disposed in a rear of the first front part, and a second inner side part extended backwardly from an inner end of the second front part and disposed within the first inner side part, and the second overlap part is extended inwardly from the second inner side part.

6. The display device according to claim 1, wherein any one of the first front cover unit and the second front cover unit is made of a transparent material, and the other one of the first front cover unit and the second front cover unit is made of an opaque material.

7. A display device comprising:
   a display module to display an image;
   a front cover, including a first front cover unit and a second front cover unit, the front cover to cover an edge of a front surface of the display module, the front cover including first side parts extended toward the display module from at least one of a first end and a second end of the front cover; and
   reflection members disposed adjacent to the display module and the front cover to reflect light that is transmitted through the front cover so as to change a color of a front surface of the display device,
   wherein the second front cover unit includes overlap parts extended to cover portions of rear surfaces of the first side parts, where the uncovered portions of the first side parts do not extend beyond the overlap parts of the second front cover unit.

8. The display device of claim 7, wherein the front cover comprises:
   the first front cover unit is made of a first material; and
   the second front cover unit is made of a second material that is disposed on a first surface of the first front cover unit so as to be adjacent to the display module.

9. The display device of claim 8, wherein the first material is a transparent material, and the second material is an opaque material.

10. The display device of claim 8, wherein the overlap parts of the second front cover are disposed so as to cover corresponding first and second ends of the first front cover.

11. The display device of claim 8, wherein the first front cover unit and the second front cover unit are integrally formed.

12. The display device of claim 8, wherein the first front cover unit and the second front cover unit are affixed to one another.

13. The display device of claim 8, wherein the first front cover unit and the second front cover unit each have a rectangular ring shape.

14. The display device of claim 8, wherein the first front cover unit and the second front cover unit are disposed so as to minimize airflow between the first front cover unit and the second front cover unit.

15. A cover to cover a display module of a display device, the cover comprising:
   a first front cover unit having first outer side parts extended at angles from each end of the first front cover unit, the first front cover unit having a first surface and a second surface;
   a second front cover unit having second outer side parts ended at angles from each end of the second front cover unit that is disposed on the second surface of the first front cover unit; and
   reflection members disposed adjacent to the display module and the first and second front cover units to reflect light that is transmitted through at least one of the first and second front cover units so as to change a color of a front surface of the display device,
   wherein the second outer side parts of the second front cover unit overlap at least portions of the first outer side parts of the first front cover unit, and at least one of the second outer side parts is disposed adjacent to the display module of the display device, where portions of the first outer side parts do not extend beyond the second outer side parts that overlap the portions of the second front cover unit.

16. The cover of claim 15, wherein the first front cover unit is made of a transparent material, and the second front cover unit is made of an opaque material.

* * * * *